US008564607B2

(12) United States Patent
Lee et al.

(10) Patent No.: US 8,564,607 B2
(45) Date of Patent: Oct. 22, 2013

(54) APPARATUS AND METHOD FOR CREATING TEXTURES OF BUILDING

(75) Inventors: Seong-Ho Lee, Daejeon (KR); Jae-Chul Kim, Daejeon (KR); Yoon-Seop Chang, Daejeon (KR); Sun-Rae Park, Daejeon (KR); Jae-Jun Yoo, Daejeon (KR); Chang-Rak Yoon, Daejeon (KR); Hak-CHeol Kim, Daejeon (KR); Ki-Jung Lee, Yongin-si (KR); Kyung-Ok Kim, Daejeon (KR); Jong-Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 421 days.

(21) Appl. No.: 12/900,592

(22) Filed: Oct. 8, 2010

(65) Prior Publication Data

US 2011/0134118 A1    Jun. 9, 2011

(30) Foreign Application Priority Data

Dec. 8, 2009  (KR) .................. 10-2009-0121202

(51) Int. Cl.
*G09G 5/00* (2006.01)
(52) U.S. Cl.
USPC .......................................... 345/582; 345/629
(58) Field of Classification Search
USPC ................................................. 345/582, 629
See application file for complete search history.

(56) References Cited

U.S. PATENT DOCUMENTS 6,208,347 B1 *  3/2001  Migdal et al. ................. 345/419
6,215,485 B1 *  4/2001  Phillips ......................... 345/698
6,664,976 B2 * 12/2003  Lofgren et al. ............... 345/634
6,747,649 B1 *  6/2004  Sanz-Pastor et al. ......... 345/428
7,098,931 B2 *  8/2006  Patterson et al. ............. 345/634
7,502,490 B2 *  3/2009  Rhoads et al. ................ 382/100
8,160,400 B2 *  4/2012  Snavely et al. ............... 382/305

(Continued)

FOREIGN PATENT DOCUMENTS

| JP | 10-079029 | 3/1998 |
| JP | 2003-115057 | 4/2003 |
| KR | 10-2009-0038127 | 4/2009 |

OTHER PUBLICATIONS

Agouris et al., An environment for content based image retrieval from large spatial databases, ISPRS Journal of Photogrammetry & Remote Sensing, Apr. 29, 1999, pp. 263-272.*

(Continued)

*Primary Examiner* — M Good Johnson
(74) *Attorney, Agent, or Firm* — Staas & Halsey LLP

(57) ABSTRACT

Disclosed is an apparatus and a method for creating textures of a building capable of storing textures of a three-dimensional building automatically extracted/obtained from spatial information convergence contents such as photographs, moving pictures, etc., including positional information and directional information, etc. together with a three-dimensional spatial information model. The apparatus for creating textures of a building, includes: an image processing apparatus that detects metadata from one or more image and creates an image topology using the metadata; and a texture processing apparatus that creates a virtual photographing environment based on geographical information and metadata detected in the image processing device, creates a building identifier list of a building model used in creating the virtual photographing environment, detects and groups images including each building based on the building identifier list and an image topology created in the image processing apparatus, and clips the textures of a building included in the grouped images.

9 Claims, 8 Drawing Sheets

(56) References Cited

U.S. PATENT DOCUMENTS

| | | | |
|---|---|---|---|
| 2008/0007567 A1* | 1/2008 | Clatworthy et al. | 345/619 |
| 2008/0304808 A1* | 12/2008 | Newell et al. | 386/52 |
| 2008/0306995 A1* | 12/2008 | Newell et al. | 707/104.1 |
| 2009/0063557 A1* | 3/2009 | MacPherson | 707/103 R |
| 2009/0079752 A1 | 3/2009 | Wexler et al. | |
| 2009/0237396 A1* | 9/2009 | Venezia et al. | 345/419 |
| 2010/0128939 A1* | 5/2010 | Stubler | 382/118 |
| 2010/0201682 A1* | 8/2010 | Quan et al. | 345/419 |
| 2013/0127856 A1* | 5/2013 | Winnemoeller et al. | 345/423 |
| 2013/0127889 A1* | 5/2013 | Winnemoeller et al. | 345/582 |

OTHER PUBLICATIONS

Fang et al., Textureshop: Texture Synthesis as a Photograph Editing Tool, ACM, 2004 date unknown, pp. 354-359.*

* cited by examiner

APPARATUS AND METHOD FOR CREATING TEXTURES OF BUILDING

CROSS REFERENCE TO RELATED APPLICATIONS

This application claims priority to Korean Patent Application No. 10-2009-0121202 filed on Dec. 8, 2009, the entire contents of which are herein incorporated by reference.

BACKGROUND OF THE INVENTION

1. Field of the Invention

The present invention relates to an apparatus and a method for creating textures of a building, and more particularly, to an apparatus and a method for creating textures of a building capable of creating textures an appearance of building from digital images including spatial information such as positional information and directional direction.

2. Description of the Related Art

Recently, Google map/Earth mainly used as a map service models points, lines, images, and polygons on a map and uses and provides them using a keyhole markup language (KML) in an XML format for storing them. Files modeling a building using the KML include textured images for each partial plane of a model along with a three-dimensional model.

Further, a digital photographing apparatus (for example, digital camera, camcorder, CCTV, etc.), which is frequently used by an expert and the public, is combined with various sensors such as a position sensor, a direction sensor, etc., to provide various information.

The topology between objects of spatial data is a concept of analyzing where it exists between objects and how it is connected to other objects around the objects. Representative spatial topology terms includes "contains", "crosses", "disjoint", "equals", "intersects", "overlaps", "touches", "within", etc. These terms defines a spatial topology representing spatial data formed of a point, a line, which are a target. A representative index calculating spatial topology is a quadtree that is a grid-based (or space-based) spatial index and an R-tree series that is a data-driven (or data dependent) spatial index.

Through this, the topology between images can be established by the positional information and the directional information that are other types of spatial information. In other words, the topology between the digital images can be established by a positional value, a directional angle, a photographing angle (angle of view). Further, the topology of the images including the specific building from the digital images photographed at various angles may be extracted using an operator and textures corresponding to an appearance of building from the extracted candidate images may be clipped and may be created by correction as an appropriate texture file, etc.

SUMMARY OF THE INVENTION

The present invention proposes to solve the above problem of the related art. It is an object of the present invention to provide an apparatus and a method for creating textures of a building capable of storing textures of a three-dimensional building automatically extracted/obtained from spatial information convergence contents such as photographs, moving pictures, etc., including positional information and directional information, etc., together with a three-dimensional spatial information model.

In order to achieve the above objects, according to an exemplary embodiment of the present invention, there is provided the apparatus for creating textures of a building, including: an image processing apparatus that detects metadata from one or more image and creates an image topology using the metadata; and a texture processing apparatus that creates a virtual photographing environment based on geographical information and metadata detected in the image processing device, creates a building identifier list of a building model used in creating the virtual photographing environment, detects and groups images including each building based on the building identifier list and an image topology created in the image processing apparatus, and clips the textures of a building included in the grouped images.

The image processing apparatus includes: a metadata detector that detects metadata from one or more image; and a topology configuration unit that creates at least one of a line and a polygon having directivity based on the metadata detected by the metadata detector and configures an image topology based on at least one of directivity of the created line and a polygon.

The image processing apparatus detects the metadata that includes photographing locations, photographing direction information, and view of angle information from one or more image.

The text processing apparatus includes: a list detector that arranges a building model based on the geographical information and the metadata detected in the image processing apparatus to create a virtual photographing environment and a building identifier list of a building model used in the virtual photographing environment; an image collector that detects and groups images including each building based on the building identifier list created in the list detector and the image topology created in the image processing apparatus; and a texture creator that clips the textures of building included in an image grouped in the image collector.

The text processing apparatus maps the clipped textures to the building model included in the virtual photographing environment created in the image processing apparatus.

The texture processing apparatus corrects the distortion of the textures mapped to the building model.

The texture processing apparatus clips the textures of a building included in an image where an angle of the photographing direction intersecting one surface of the building is a right angle.

The apparatus for creating textures of building further includes a storage apparatus that stores a building model and geographical information used to create the virtual photographing environment and stores textures created in the texture processing apparatus.

The storage apparatus includes: a first storage apparatus that stores the plurality of building models having identifiers and the geographical information and a second storage apparatus that stores textures created in the texture processing apparatus.

The storage apparatus stores meta information including textures matched to each surface of the building model.

In order to achieve the above object, according to another exemplary embodiment of the present invention, there is provided a method for creating textures of a building, including: an image processing step that detects metadata from one or more image and creates an image topology using the metadata by an image processing apparatus; an image detecting step that detects an image including each building based on geographical information and an image topology created in the image processing step by the texture processing apparatus; and a texture processing step that clips the textures of a building including in an image detected in the image detecting step by the texture processing apparatus.

The image processing step includes: a metadata detecting step that detects metadata from one or more image by the image processing apparatus; a directivity creating step that creates at least one of a line and a polygon having directivity based on the metadata detected in the metadata detecting step by the image processing apparatus; and a topology configuring step that configures an image topology based on at least one directivity of the line and polygon created in the directivity creating step.

The image processing step detects the metadata that includes photographing locations, photographing direction information, and view of angle information from one or more image by the image processing apparatus.

The image processing step detects the geographical information and the building model from the storage apparatus by the image processing apparatus.

The image detecting step includes: a virtual photographing environment creating step that arranges, by the texture processing apparatus, a building model based on the geographical information and the metadata detected in the image processing apparatus to create a virtual photographing environment; a list creating step that creates, by the image detecting step, a building identifier list of a building model used in creating the virtual photographing environment at the virtual photographing environment creating step; and an image collecting step that detects and groups, by the image detecting step, an image including each building based on the building identifier list created at the list creating step and an image topology created a the image processing step.

The texture processing step clips the textures of a building included in an image where an angle of the photographing direction intersecting one surface of the building is a right angle by the texture processing apparatus.

The method for creating textures of a building further includes a texture mapping step that maps the clipped textures to the building model included in the virtual photographing environment created in the image processing step by the texture processing apparatus.

The method for creating textures of a building further includes correcting the distortion of the textures mapped to the building model at the texture mapping step by the texture processing apparatus.

The method for creating textures of a building further includes a texture storing step that stores textures created at the textures processing step by the storage apparatus.

The storing step stores meta information including the textures mapped at each surface of the building model by the storage apparatus.

According to the exemplary embodiments of the present invention, the apparatus and method for creating textures of a building creates the textures of a building from the digital images photographed by a digital camera or a camcorder carried by general users, thereby making it possible to provide more realistic building images than textures obtained from data such as satellite/aircraft images.

Further, the apparatus and method for creating textures of a building stores and provides the created building textures together with the three-dimensional building model, thereby making it possible to use the realistic building images in the three-dimensional map service.

DETAILED DESCRIPTION OF THE PREFERRED EMBODIMENTS

Figure 1:
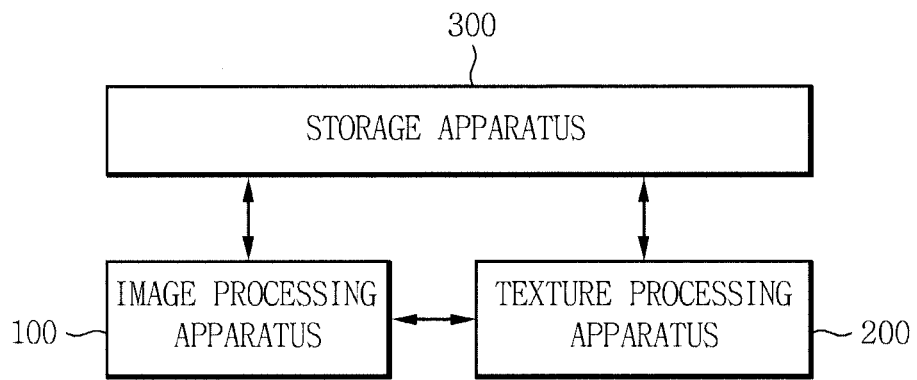
FIG. 1 is a block diagram showing an apparatus for creating textures of a building according to an exemplary embodiment of the present invention.

Hereinafter, exemplary embodiments of the present invention will be described in detail with reference to the accompanying drawings so that those skilled in the art may easily implement the spirit of the present invention. First of all, we should note that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention.

First, terms used in describing embodiments of the present are defined as follows.

Geographical information includes three-dimensional GIS information, for example, three-dimensional topographical information such as a digital elevation model (DEM), building model information, a road network, various point of interests (POI), and the like.

An image generally includes an image photographed by a digital photographing apparatus, that is, photographs or moving pictures. Each image includes various metadata, such as photographed locations (positional information), photographing direction information (directional information), angle of view, etc. The metadata may be included in an image such as an exchangeable image file format (EXIF) and may be stored in an image and a pair of independent file types.

Figure 2:
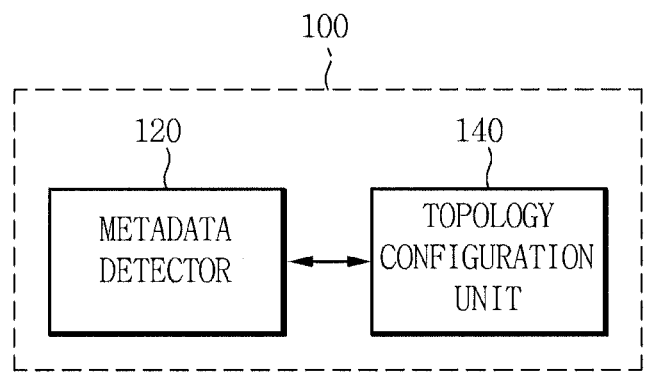
FIG. 2 is a block diagram for explaining an image processing apparatus of FIG. 1.
Figure 3:
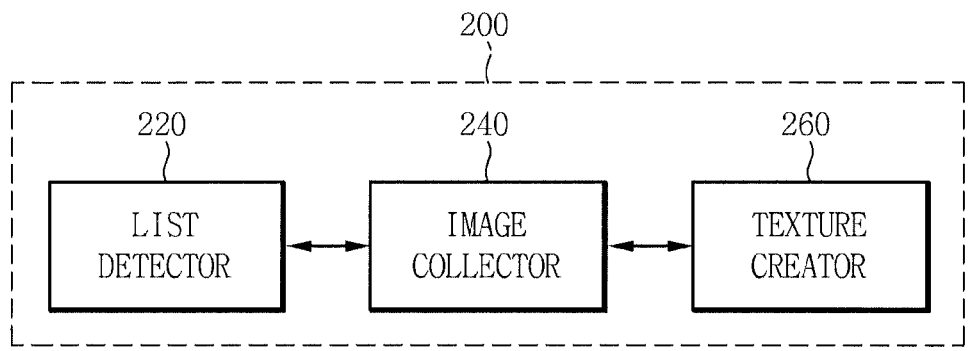
FIGS. 3 and 4 are block diagrams for explaining a texture processing apparatus of FIG. 1.
Figure 4:
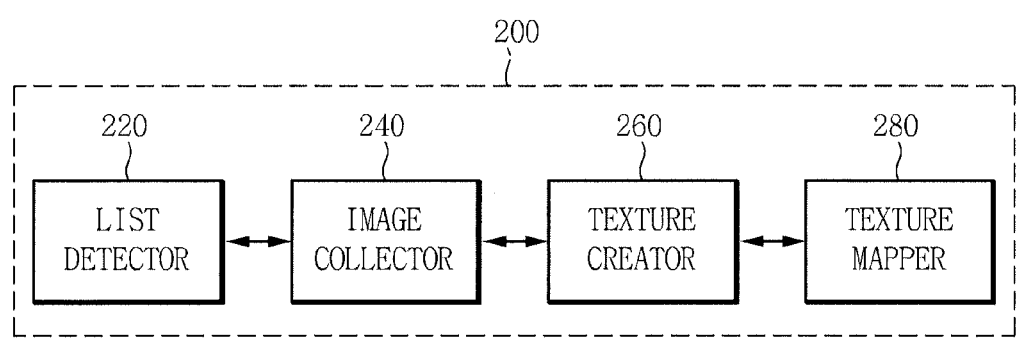
Figure 5:
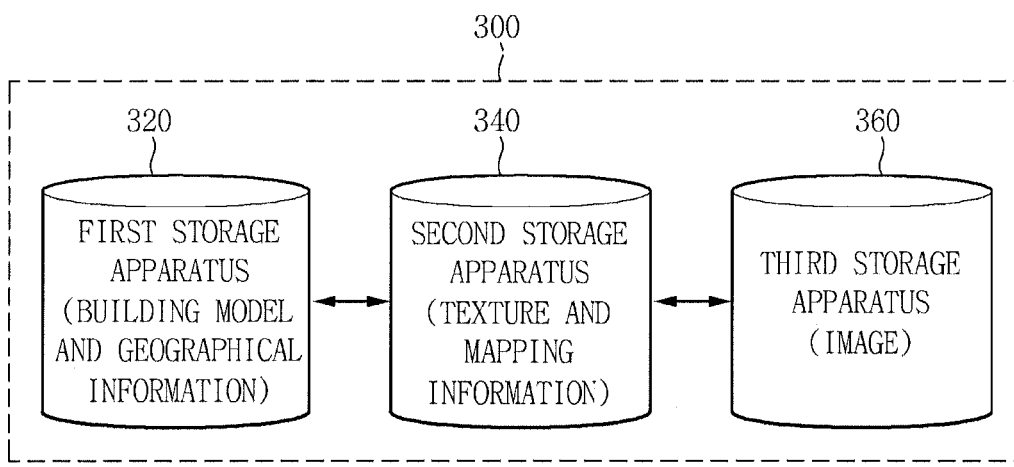
FIG. 5 is a block diagram for explaining a storage apparatus of FIG. 1.

Hereinafter, an apparatus for creating textures of building according to an exemplary embodiment of the present invention will be described in detail with reference to the accompanying drawings. FIG. 1 is a block diagram showing an apparatus for creating textures of building according to an exemplary embodiment of the present invention. FIG. 2 is a block diagram for explaining an image processing apparatus of FIG. 1, FIGS. 3 and 4 are block diagrams for explaining a texture processing apparatus of FIG. 1, and FIG. 5 is a block diagram for explaining a storage apparatus of FIG. 1.

Figure 6:
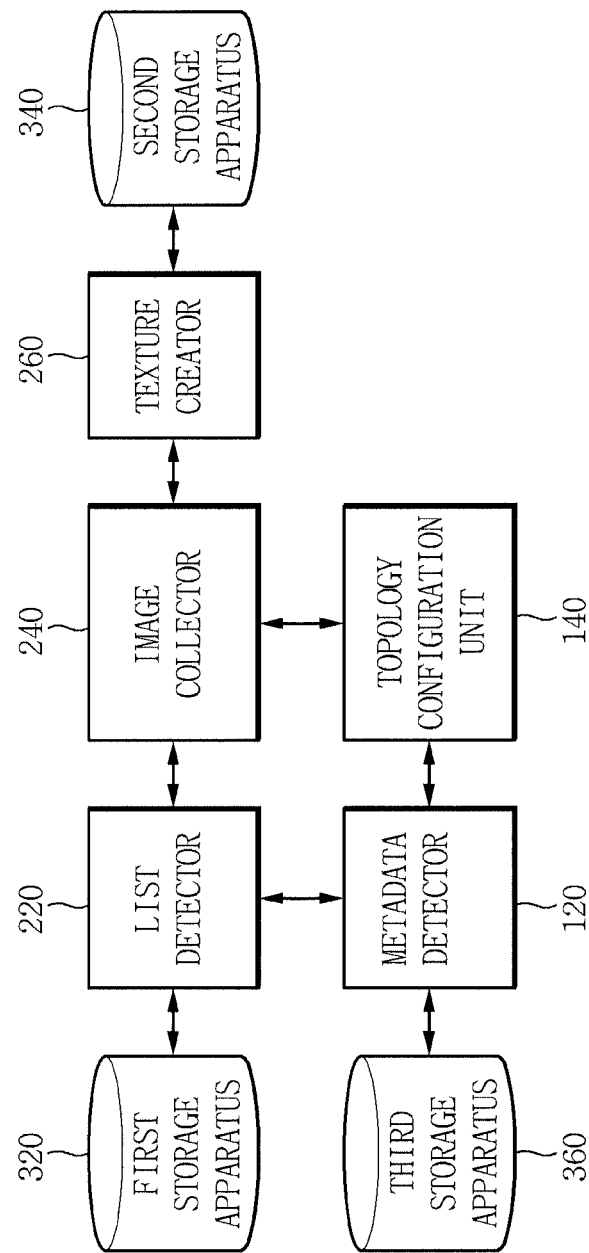
FIGS. 6 and 7 are block diagrams of an apparatus for creating textures of a building according to another exemplary embodiment of the present invention.
Figure 7:
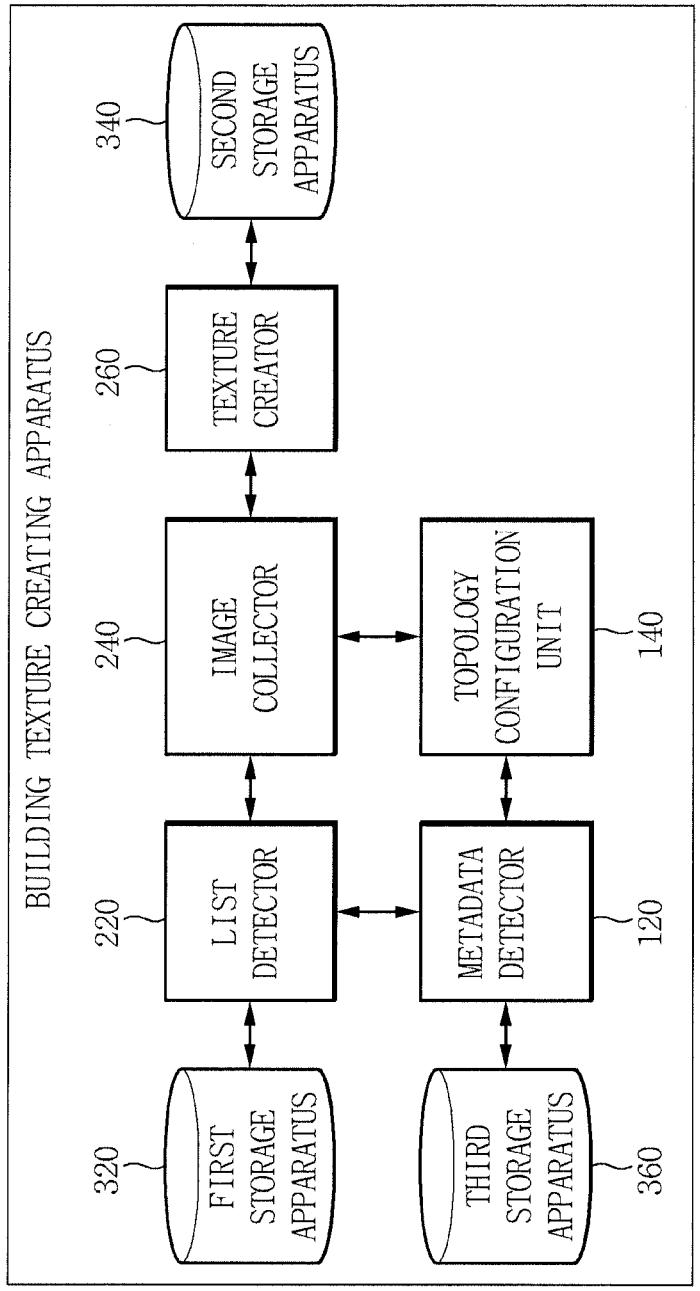

FIGS. 6 and 7 are block diagrams of an apparatus for creating textures of a building according to another exemplary embodiment of the present invention.

As shown in FIG. 1, an apparatus for creating textures of a building includes an image processing apparatus 100, a texture processing apparatus 200, and a storage apparatus 300.

The image processing apparatus 100 detects meta data from one or more images and creates an image topology using metadata. At this time, the image processing apparatus 100 detects metadata including photographing locations, photographing direction information, and view of angle information from one or more image. To this end, as shown in FIG. 2, the image processing apparatus 100 includes a metadata detector 120 and a topology configuration unit 140.

The metadata detector 120 detects metadata from one or more image. In other words, the metadata detector 120 detects metadata including photographing locations, photographing direction information, view of angle information, etc., from an image. At this time, the metadata detector 120 detects metadata from EXIF information included in an image or detects metadata from a metadata file associated with an image. Herein, the metadata detector 120 may detect an image identifier together with metadata. As the image identifier, a file name of an image or a unique number and a unique code of each image are used.

The topology configuration unit 140 configures the image topology based on the metadata detected in the metadata detector 120. In other words, the topology configuration unit 140 configures the image topology based on various metadata detected in the metadata detector 120. To this end, the topology configuration unit 140 creates at least one of a line and a polygon having directivity using the photographing locations, the photographing direction information, the view of angle information, etc., included in the metadata detected from the plurality of images. The topology configuration unit 140 configures the image topology based on at least one of directivity of the created line and a polygon. In other words, the topology configuration unit 140 configures the image topology including whether a plurality of images are intersected with each other and the directivity is converged and diverged, etc. Herein, the topology configuration unit 140 may be defined as a topology between a line having directivity or a polygon having directivity formed of a position value (latitude and longitude), an azimuth ($\theta$), a view of angle (W), etc. photographing each image.

The texture processing apparatus 200 clips the textures of a building included in the image based on the geographical information and the metadata detected in the image processing apparatus 100. In other words, the texture processing apparatus 200 creates a virtual photographing environment, a building identifier list of a building model used for creating the virtual photographing environment, detects and groups images including each building based on the building identifier list and the image topology created from the image processing apparatus 100, and clips the textures of building included in the grouped image. To this end, as shown in FIG. 3, the texture processing apparatus 200 includes a list detector 220, an image collector 240, and a texture creator 260.

The list detector 220 arranges the building model and creates the virtual photographing environment based on the geographical information and the metadata detected in the image processing apparatus 100. In other words, the list detector 220 detects the geographical information from the storage apparatus 300 based on the metadata detected in the metadata detector 120. The metadata detector 120 arranges the building model based on the detected geographical information and the metadata and configures the virtual photographing environment. At this time, the geographical information filled in the virtual photographing environment uses data from the three-dimensional geographical information and uses the building model stored in the storage apparatus 300.

The list detector 220 creates the building identifier list of the building model used in the virtual photographing environment. In other words, the list detector 220 detects the identifier of the building model used in the virtual photographing environment to create the building identifier list. The identifier is associated with the building model and is stored in a storage apparatus 300 by a unique number allocated to each building model. In other words, the list detector 220 creates the building identifier list for identifying the photographed buildings in each image. At this time, the list detector 220 creates the building identifier list for each image.

The image collector 240 detects and groups images including each building based on the building identifier list created by the list detector 220 and the image topology created in the image processing apparatus 100.

In other words, the image collector 240 searches and groups images including each building by the building identifier list of the building model for each image that is created and managed in the list detector 220 and the image topology configured in the topology configuration unit 140. At this time, the image collector 240 searches images associated with each building through a spatial phase operation that expands the directional information for the image topology configured in the topology configuration unit 140.

The texture creator 260 clips textures of a building included in the images grouped in the image collector 240. In other words, the texture creator 260 can cut the textures of a building from images photographing a building in various directions. At this time, the texture creator 260 clips the textures of a building from minimally distorted image. As a method for searching minimally distorted images from images, a method for selecting images where an angle intersecting a surface of a building with a photographing direction is a right angle (that is 90°) is used. At this time, the texture creator 260 may correct the distortion of the clipped textures when the distortion occurs in the clipped textures.

The texture processing apparatus 200 may map textures corresponding to each surface of the building model by using the three-dimensional building model used in creating the virtual photographing environment for the created (cut) textures. The texture processing device 200 stores the building model mapping the textures in the storage apparatus 300. The texture processing apparatus 200 may store meta information including textures mapped to each surface of the building model together with the building model. To this end, as shown in FIG. 4, the texture processing apparatus 200 may further include a texture mapper 280 that maps the textures to the building model.

The storage apparatus 300 stores the building model and the geographical information used in generating the virtual photographing environment and textures created in the texture processing apparatus 200. To this end, as shown in FIG. 5, the storage apparatus 300 includes a first storage apparatus 320 that stores a plurality of building models having an identifier and the geographical information, a second storage apparatus 340 that stores textures generated in the texture processing apparatus 200, and a third storage apparatus 360 that stores the plurality of images. Herein, the second storage apparatus 340 stores mapping information including meta information on which texture is mapped to each surface of building.

In describing the building texture generating device according to the exemplary embodiment of the present invention with reference to the accompanying drawings, the embodiment describes the case where each component of the image processing apparatus 100, the texture processing apparatus 200, and the storage apparatus 300 is operated in the image processing apparatus 100, the texture processing apparatus 200, and the storage apparatus 300, but is not limited thereto. As shown in FIG. 6, each component may be implemented as each independent apparatus to process the corresponding functions. Further, the functions of the units are divided for convenience of description, but are not necessarily limited to the above-mentioned divided state.

Further, the image processing apparatus 100, the texture processing apparatus 200, and the storage apparatus 300 are shown to be operated as the independent apparatus without being limited thereto. As shown in FIG. 7, they are implemented in one body and may process the corresponding functions.

Figure 8:
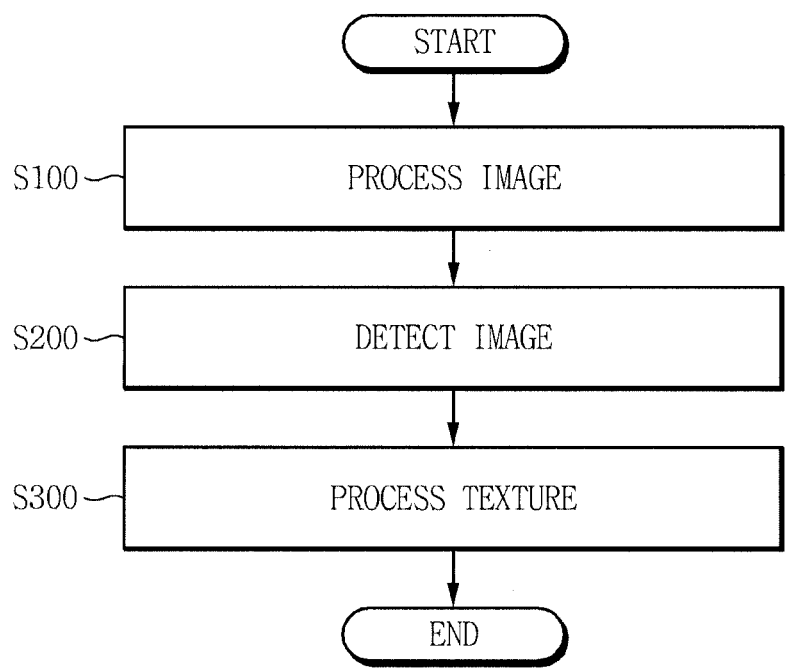
FIG. 8 is a flow chart for explaining a method for creating textures of a building according to an exemplary embodiment of the present invention.
Figure 9:
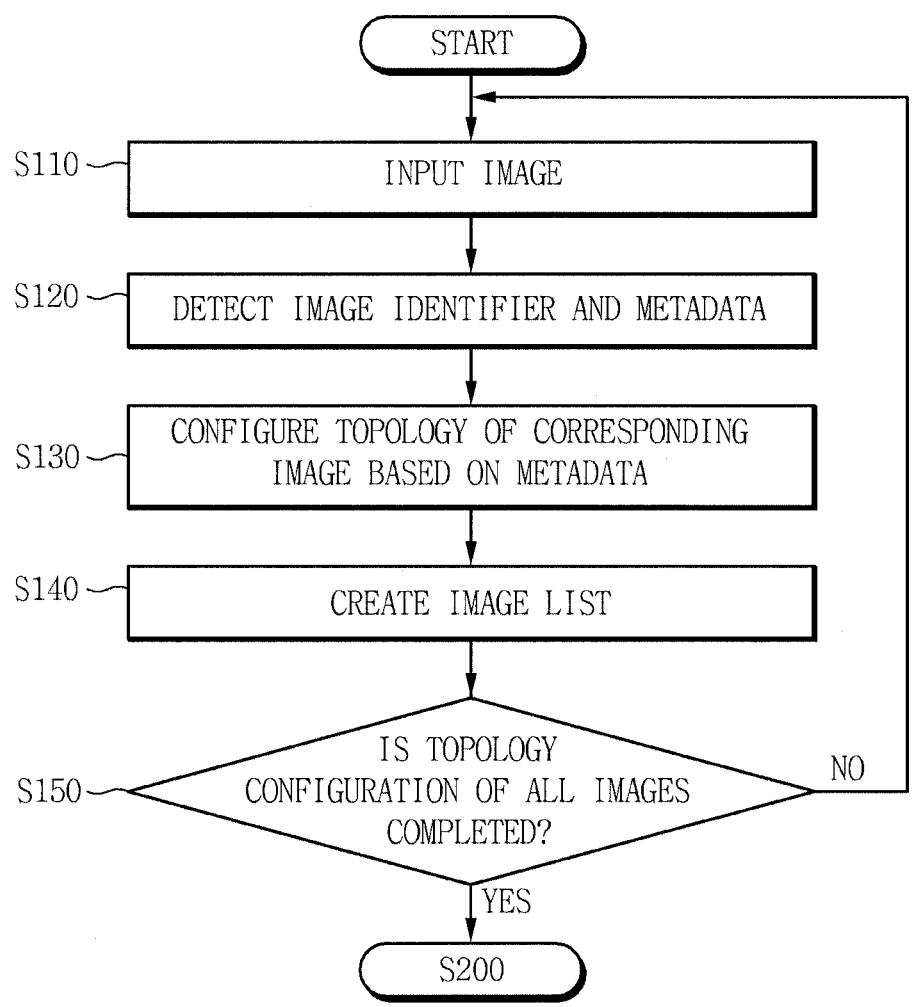
FIG. 9 is a flow chart for explaining the image processing process of FIG. 8.
Figure 10:
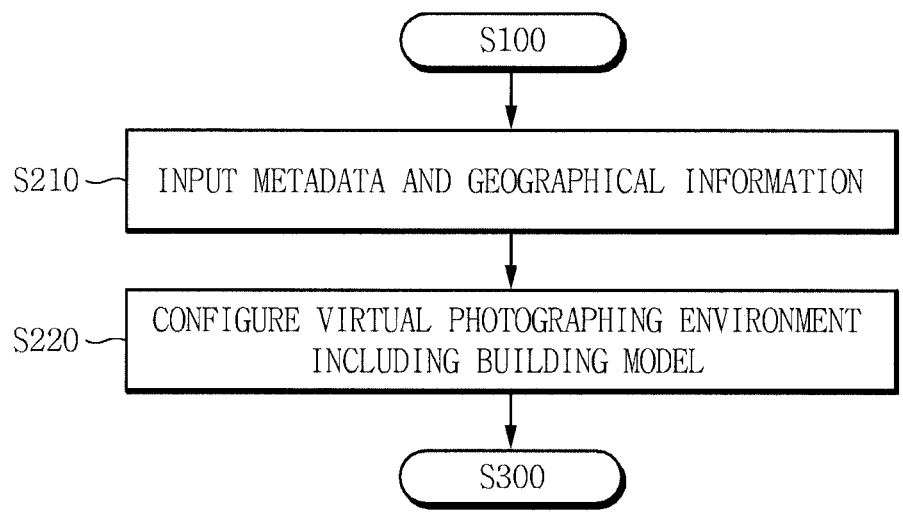
FIG. 10 is a flow chart for explaining the image detecting process of FIG. 8.
Figure 11:
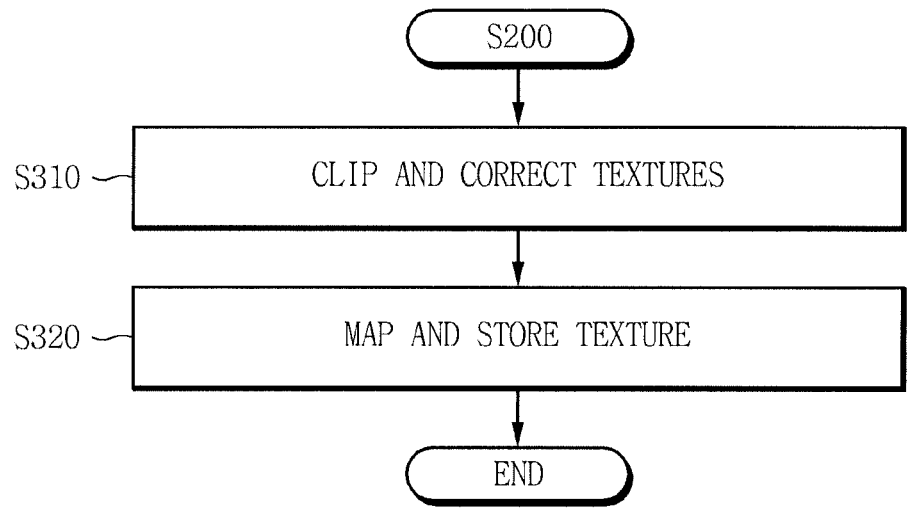
FIG. 11 is a flow chart for explaining the texture processing process of FIG. 8.
Figure 12:
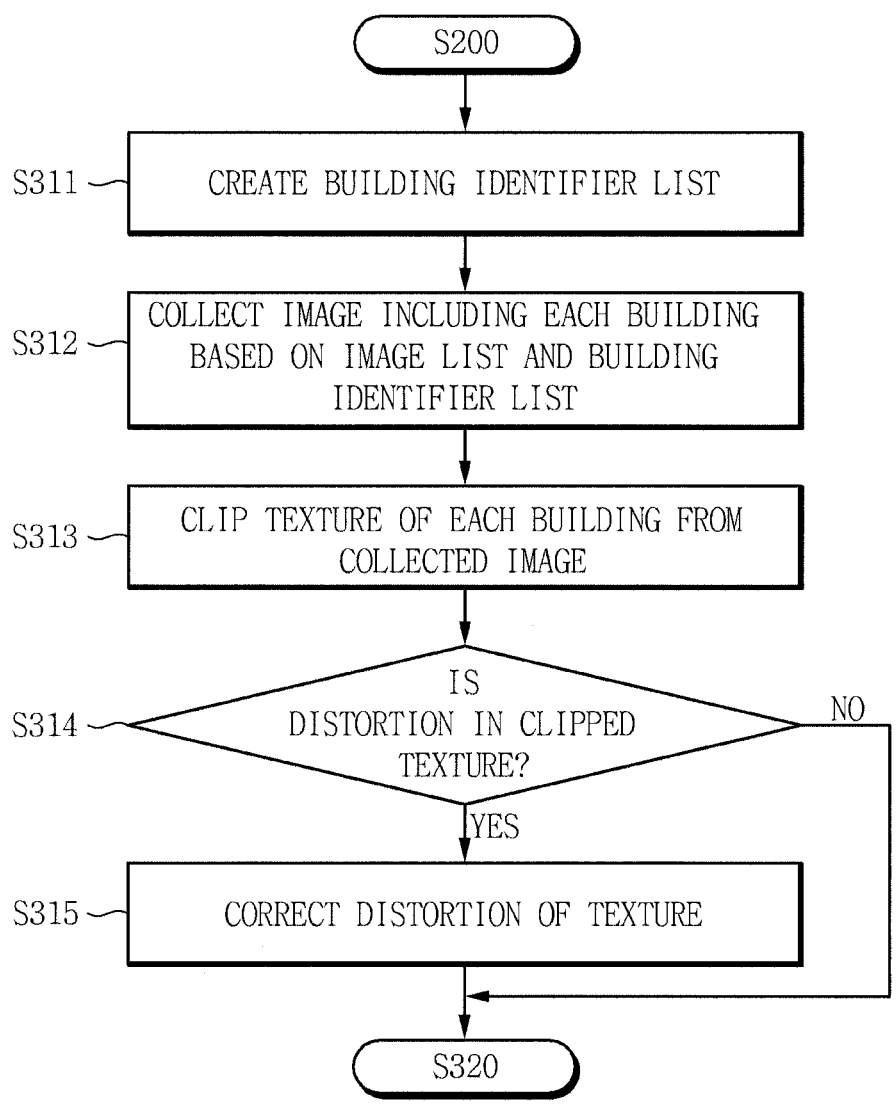
FIG. 12 is a flow chart for explaining a texture clipping and correcting process of FIG. 11.

Hereinafter, an apparatus for creating textures of a building according to an exemplary embodiment of the present invention will be described in detail with reference to the accompanying drawings. FIG. 9 is a flow chart for explaining the image processing process of FIG. 8. FIG. 10 is a flow chart for explaining the image detecting process of FIG. 8 and FIG. 11 is a flow chart for explaining the texture processing process of FIG. 8. FIG. 12 is a flow chart for explaining a texture clipping and correcting step of FIG. 11.

First, the storage apparatus 300 stores the plurality of images, the building model, and geographical information that are used for the texture clipping.

The image processing apparatus 100 detects metadata from one or more image and performs an image processing step generating the image topology using the metadata (S100).

Specifically describing the image processing step (S100), the image processing step 100 receives the plurality of images stored in the storage apparatus 300 one by one (S110) to detect the image identifier and the metadata from the corresponding image (S120).

The image processing apparatus 100 configures the topology of the corresponding image based on the detected metadata (S130) and creates the image list including the metadata and topology of the corresponding image (S140). At this time, the image processing apparatus 100 repeatedly performs the above-mentioned steps S110 to S140 until the creation of the image list of the plurality of images stored in the storage apparatus 300 is completed (S150; Yes) so as to create the image list including all the images.

Next, the text processing apparatus 200 performs the image detecting step detecting the images including each building by using the geographical information and the image topology created in the image processing step (that is, step S100) (S200).

More specifically describing the image detecting step (S200), the text processing apparatus 200 receives the metadata and the geographical information from the image processing apparatus 100 (S210). The text processing apparatus 200 receives the metadata including the photographing position value (latitude and longitude), the azimuth (θ), the view of angle (W), etc., from the image processing apparatus 100. At this time, the text processing apparatus 200 may receive the geographical information and the image metadata from the storage apparatus 300.

The texture processing apparatus 200 configures the virtual photographing environment where the building model is arranged based on the input metadata and geographical information (S220). In other words, the texture processing apparatus 200 detects and arranges the building model from the storage apparatus 300 based on the input metadata and the geographical information. At this time, the texture processing apparatus 200 compares the photographing position value (latitude and longitude), the azimuth (θ), and the view of angle (W), etc., of the metadata with the geographical information and arranges the building model at the place corresponding to the position of the actual building, thereby configuring the virtual photographing environment.

The texture processing apparatus 200 performs the texture processing step that clips the textures of the building included in the image detected in the image detecting step (that is, step S200) (S300).

More specifically describing the texture processing step S300, the texture processing apparatus 200 uses the virtual photographing environment to perform the clipping and correcting processing on the texture of each building included in the corresponding image (S310).

At this time, at the texture clipping and correcting step S310, the texture processing apparatus 200 uses the identifier of the used building model in generating the virtual photographing environment to create the building identifier list (S311) and then, collects the image including each building by using the image list and the building identifier list generated in the image processing apparatus 100 (S312). At this time, the texture processing apparatus 200 excludes the building covered by a view parameter at the position where an image is photographed and searches only the building actually viewed to generate the building identifier list. The texture processing apparatus 200 collects the images associated with the building (that is, including the corresponding building) included in the images by using the topology and the building identifier list included in the image list.

The texture processing apparatus 200 clips the textures of each building from the collected image (S313). In other words, the texture processing apparatus 200 clips the textures of a building from the minimally distorted image. At this time, when the distortion occurs in the clipped texture (S314; YES), the text processing apparatus 200 corrects the distortion of the corresponding texture (S315).

The texture processing apparatus 200 maps the textures clipped to the building model included in the virtual photographing environment when the texture clipping and correcting step is completed and stores the mapping information together with the building model in the storage apparatus 300 (S320). At this time, the texture processing apparatus 200 stores the building model and the textures corresponding to each surface. The texture processing apparatus 200 stores the mapping information of the corresponding building model.

As described above, the apparatus and method for creating textures of a building creates the textures of a building from the digital images photographed by a digital camera or a camcorder carried by general users, thereby making it possible to provide more realistic images than textures obtained from data such as satellite/aircraft images.

Further, the apparatus and method for creating textures of a building stores and provides the created building textures together with the three-dimensional building model, thereby making it possible to use the realistic building images in the three-dimensional map service.

Although exemplary embodiments of the present invention have been described, it will be appreciated by those skilled in the art that various modifications and changes may be made without departing from the appended claims of the present invention.

What is claimed is:

1. A method for creating textures of a building, comprising:
    an image processing step that detects metadata from one or more image and creates an image topology using the metadata by an image processing apparatus;
    an image detecting step that detects an image including each building based on geographical information and an image topology created in the image processing step by the texture processing apparatus;

a texture processing step that clips the textures of a building including in an image detected in the image detecting step by the texture processing apparatus; and a texture storing step that stores textures created at the textures processing step by the storage apparatus.

2. The method for creating textures of a building according to claim 1, wherein the image processing step includes:

a metadata detecting step that detects metadata from one or more image by the image processing apparatus;

a directivity creating step that creates at least one of a line and a polygon having directivity based on the metadata detected in the metadata detecting step by the image processing apparatus; and a topology configuring step that configures an image topology based on at least one directivity of the line and a polygon created in the directivity creating step.

3. The method for creating textures of a building according to claim 1, wherein the image processing step detects the metadata that includes photographing locations, photographing direction information, and view of angle information from one or more image by the image processing apparatus.

4. The method for creating textures of a building according to claim 1, wherein the image processing step detects the geographical information and the building model from the storage apparatus by the image processing apparatus.

5. The method for creating textures of a building according to claim 1, wherein the image detecting step includes:

a virtual photographing environment creating step that arranges, by the texture processing apparatus, a building model based on the geographical information and the metadata detected in the image processing apparatus to create a virtual photographing environment;

a list creating step that creates, by the image detecting step, a building identifier list of a building model used in creating the virtual photographing environment at the virtual photographing environment creating step; and an image collecting step that detects and groups, by the image detecting step, an image including each building based on the building identifier list created at the list creating step and an image topology created by the image processing step.

6. The method for creating textures of building according to claim 1, wherein the texture processing step clips the textures of building included in an image where an angle of the photographing direction intersecting one surface of the building is a right angle by the texture processing apparatus.

7. The method for creating textures of a building according to claim 1, further comprising a texture mapping step that maps the clipped textures to the building model included in a virtual photographing environment created in the image processing step by the texture processing apparatus.

8. The method for creating textures of building according to claim 7, further comprising correcting the distortion of the textures mapped to the building model at the texture mapping step by the texture processing apparatus.

9. The method for creating textures of a building according to claim 1, wherein the storing step stores meta information including the textures mapped at each surface of the building model by the storage apparatus.

* * * * *